June 12, 1962  W. C. WHITE  3,039,025
HUMIDITY SENSITIVE DEVICE
Filed Aug. 20, 1954
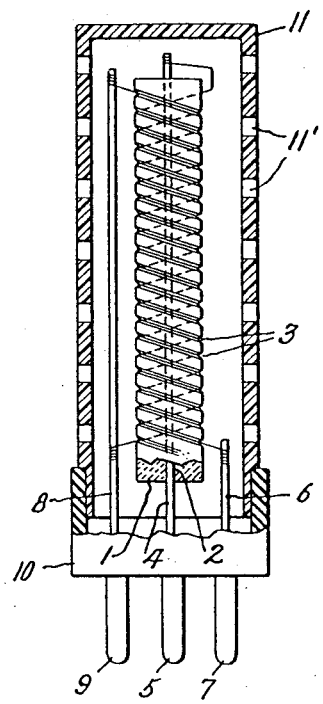
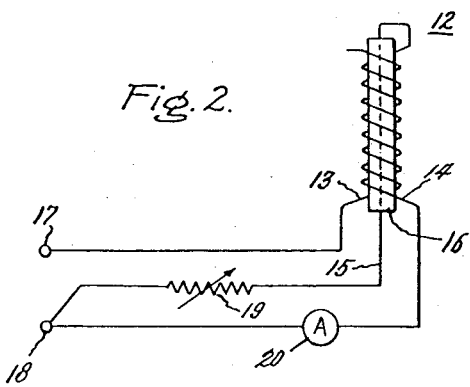
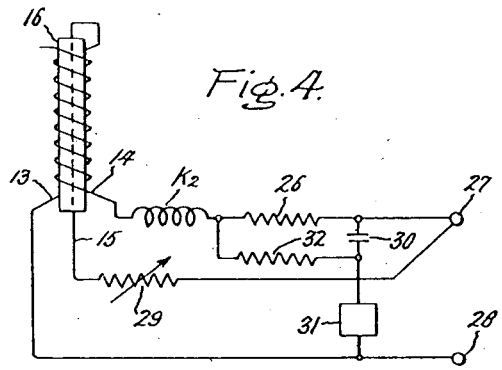
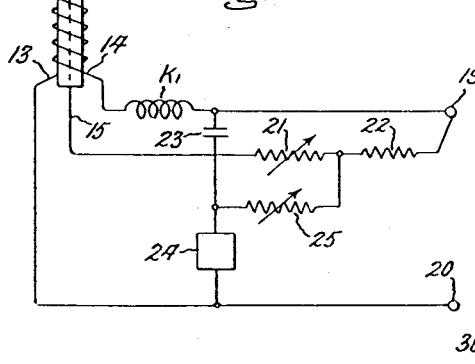
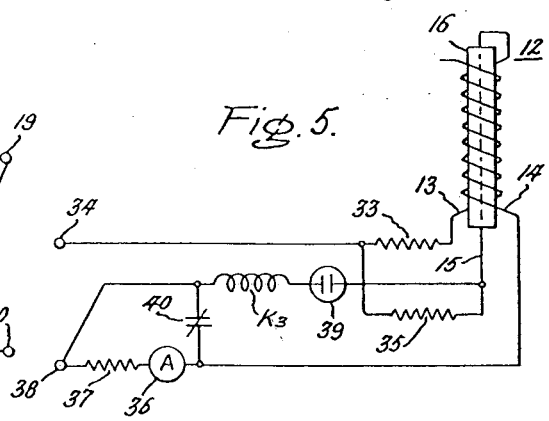
*Inventor:*
*William C. White,*
by *Paul A. Frank*
*His Attorney.*

United States Patent Office 3,039,025
Patented June 12, 1962

3,039,025
HUMIDITY SENSITIVE DEVICE
William C. White, Schenectady, N.Y., assignor to General Electric Company, a corporation of New York
Filed Aug. 20, 1954, Ser. No. 451,265
3 Claims. (Cl. 317—157)

My invention generally relates to humidity sensitive devices and, more particularly, to a humidity sensitive element and an associated electrical circuit.

In the past, it has been known to provide a hygroscopic material on the surface of a nonporous nonconducting member and to provide a pair of electrical conductors in contact relationship with the hygroscopic material. In such devices, some form of ohmmeter is utilized to measure the resistance between the conductors, which is dependent upon the amount of water contained in the hygroscopic material. Consequently, this resistance is indicative of the humidity of the atmosphere in which the device is located. While such devices are suitable for use in radiosonde equipment, such devices have not been widely used in humidity sensitive devices which are suitable for industrial or home use because of the small amounts of current which may be reliably provided between the conductors.

It is, therefore, an important object of my invention to provide a humidity sensitive element which is capable of conducting currents of suitable magnitude for the direct operation of control relays.

Another object of my invention is to provide a new and improved humidity sensitive device having a long operating life and which may be employed for the direct operation of available alternating current relays.

A further object of my invention is to provide a new and improved humidity sensitive device which may be facilely adjusted for operation at different values of humidity.

A still further object of my invention is to provide a new and improved humidity sensitive device which may be directly operated at standard home and industrial power line frequencies and voltages.

A yet further object of my invention is to provide a new and improved humidity sensitive device having a sufficiently rapid response to changes in humidity for home and industrial use.

In the attainment of the foregoing objects I provide a device including a porous low conductivity member in the pores of which is provided a hygroscopic material. The core so provided is wound with a pair of interleaved helical conductors. One such conductor has one open end and the other has terminals connected at each end so that a heating current may be provided thereto. For some special uses, however, it is desirable to have both conductors provided with terminals at each end.

For further objects and advantages, and for a better understanding of my invention, attention is directed to the following description and accompanying drawings and also to the appended claims wherein those features of novelty which characterize my invention are pointed out with particularity.

In the drawing, FIGURE 1 illustrates a partial sectional view of a humidity sensitive device; FIGURES 2, 3, 4 and 5 illustrate schematic diagrams of electrical circuits used in conjunction with the device of FIGURE 1.

FIGURE 1 illustrates a cylindrical core 1 which is provided with a centrally disposed longitudinal conduit 2 and a plurality of interleaved helical grooves 3. A rigid electrical conductor 4 is provided within conduit 2 and extends outwardly from the core at both ends. Conductor 4 supports the core in a vertical position and the lower end thereof is connected to terminal pin 5. An electrical conductor 6 is connected at one end to terminal pin 7, the other end acting as a terminal for one of the helical conductors within one of grooves 3. The other end of this helical conductor is connected to the upper end of conductor 4. An electrical conductor 8 is connected at one end to a terminal pin 9. To a lower portion of this conductor 8 there is also connected one end of the second helical conductor. Conductor 8 extends close to and parallel to the core and at its upper end the other end of the same helical conductor is connected. Terminal pins 5, 7, and 9 are supported by and extend partially within a cup-shaped base member 10. An envelope 11 provided with a plurality of openings 11' in the walls thereof encloses the core and its associated conductors and is attached to base 10. A source of voltage is connected between terminals 5 and 7 to cause a current to flow in the helical conductor connected to conductors 4 and 6 and heat core 1.

Core 1 is constructed of a porous, low-conductivity material, such, for example, as a high purity low-fired alumina. The term low-fired is used to define an alumina which is fired to approximately 1350° C. Consequently, core 1 is relatively soft. The helical conductors are preferably platinum or nickel or other metal that will eliminate the possibility of oxidation or corrosion. A hygroscopic material, such, for example, as sodium dichromate, magnesium, or lithium chloride or mixtures of such salts, is embedded within the pores of the alumina.

These may be introduced as follows: A saturated distilled water solution of the desired salt or mixtures of salts is prepared, and this is diluted by the addition of four more equal parts by volume of distilled water. The ceramic core, which must be clean, is soaked in this dilute solution for 20 hours. It is then blotted dry and put in an air oven at about 85° C. for one hour to dry out thoroughly. It is then energized for about 50 hours as an aging or stabilizing process.

Humidity-sensitive elements that function satisfactorily can be made by means of wide variations of the above procedure. An exact procedure is desirable, however, to give close uniformity of characteristics and thus satisfactory electrical interchangeability among elements made in quantity.

The choice of salt used depends upon the broad range of humidity which is desired to give the necessary value of conduction current between the pair of helical conductors. For example, lithium chloride is suitable for relative humidities under 50 percent. For high humidity values, a salt is used, such, for example, as sodium dichromate. A saturated solution of such a salt is less responsive to humidity and, therefore, produces in the air of a closed space a higher value of relative humidity than does lithium chloride.

By the above process, a large amount of the humidity-sensitive material is utilized such that relatively high currents may be provided therein without appreciably shortening the life of the device. In prior art type elements wherein the hygroscopic material is provided only in the form of a thin layer on the wall of a glass tube, high currents cannot be employed.

A further aspect of my invention which is of considerable importance involves the supplying of current through one of the helical conductors in order to heat the core above the ambient temperature of the surroundings.

In one form of the prior art device, some heating of the hygroscopic material is effected by the conduction current which passes between the electric conductors, and, consequently, within the hygroscopic material. My device also exhibits this inherent characteristic, but the addition of the heating coil through which a controlled current can be passed introduces a number of new and useful operating characteristics. By thus providing a three-terminal humidistat element wherein heating current may be supplied independently between two of these terminals, the sensitive element may be conveniently stabilized and adjusted to operate a relay at different desired values of humidity. Furthermore, the time of response of the element may be conveniently decreased. Also, this heater winding provides a means for compensating for variables in the operating conditions.

FIGURE 2 illustrates a humidity-sensitive device 12 of the type illustrated in FIGURE 1 which is provided with a pair of helical conductors 13 and 14, and a conductor 15 internally disposed within a core 16 and having one end connected to the upper end of helical coil 13. An electric terminal 17 is electrically connected to the other end of coil 13, and an electrical terminal 18 is electrically connected through a variable resistor 19 to the other end of conductor 15. An ammeter 20 is interconnected between one end of coil 14 and terminal 18. When employed for the measurement of humidity for household purposes, the usual 120-volt, 60-cycle energy supply is connected across terminals 17 and 18. When, however, the device is used for other applications where such a supply of energy is not available, other frequencies and voltages may be satisfactorily utilized.

In operating the humidity-sensitive device of FIG. 2, variable resistor 19 is adjusted to provide the desired magnitude of heating current in coil 13. The amount of heat transferred to the core from coil 13 and also the humidity of the surrounding atmosphere determines the amount of moisture in the core, and thus the current in conductor 14 and consequently, in ammeter 20. Resistor 19 is thus used to calibrate or initially set the instrument, as well as to compensate for other variables such as ambient temperature.

This element has some interesting electrical characteristics. For instance, assume that no supplementary heating current is supplied in coil 13, and the line voltage suddenly increases by an appreciable amount of the order of 20 percent. At first, the current between the coils increases, but in a few moments, due to the increased heating effect thereof, the resistance of the core increases (due to its drying out) to such a value that there is a decrease of the current to a lesser amount than it was before the line voltage increased. This same effect occurs in reverse if the line voltage decreases. Thus, the device, at a constant value of humidity, exhibits a nearly constant wattage form of load through a wide range of voltages.

By thus energizing the heater element from the line such that a supplementary heating current is supplied thereto, the relationship between humidity and measuring current may be adjusted to provide relay operation throughout a wide range of humidity (at any value between about 40 percent and 100 percent relative humidity). It is often desirable to supply this heater current through a step-down transformer, and since only about one watt maximum is required, this is a simple procedure.

By the use of a proper value of conduction current series resistance, which may be readily provided by means of a relay coil winding, a rapidly rising, almost unstable relationship between increasing humidity and interelectrode measuring current is obtained. This is particularly suitable for an on-off type of relay operation. Such a condition is frequently desirable and is obtainable in an embodiment such as is illustrated in FIGURE 3.

The core itself has a negative temperature coefficient of resistance such that the interelectrode current increases with increasing temperatures. When, however, the temperature of the core is raised above ambient, a drying out of the core occurs, and this effect is exactly opposite and more pronounced than the temperature coefficient.

FIGURE 3 illustrates a humidity sensitive device for direct operation of a load relay. In this device, conductor 14 of the humidity-sensitive device 12 is connected through the coil of relay K1 to a terminal 19. Helical conductor 13 is driectly connected to a terminal 29, and conductor 15 is connected through the series connection of a variable resistor 21, and a resistor 22 to terminal 19. A normally open contact 23 of relay K1 is interconnected between a load 24 and terminal 19. A second terminal of load 24 is connected to terminal 20. It may thus be seen that when contact 23 is closed, energy connected between terminals 19 and 20 is supplied to the load device 24. A variable resistor 25 is interconnected between the junction of resistors 21 and 22 and the junction of contact 23 and load 24.

The device of FIGURE 3 is a direct acting humidity sensitive device, and the circuit arrangement comprising resistors 21, 22, and 25 provides an anticipating device. For example, when the humidity of the atmosphere in which core 16 is located becomes sufficiently high such that the current in conductor 14 and in conductor 13 energizes relay K1 and, consequently, closes contact 23, energy is supplied to load 24. At the same time, however, variable resistor 25 is connected in parallel with resistor 22. As a result, by the proper adjustment of the resistance of resistor 25 in relation to the resistance of resistor 22, the heating current may at this time be increased such that core 16 is heated to a higher temperature level thereby reducing the moisture content thereof by drying of the core and thereby increasing the resistance appearing between coils 13 and 14. The control provided is, therefore, of the on-off type, and the value of humidity about which it operates may be adjusted by means of resistor 21.

FIGURE 4 shows an electric circuit arrangement to prevent possible chattering of the relay contacts due to the transient response of the system. In this arrangement, coil 14 is connected through the coil of a relay K2 and a resistor 26 to a terminal 27. Conductor 13 is directly connected to a terminal 28, and conductor 15 is connected through a variable resistor 29 to terminal 27. The series connection of a normally open contact 30 of relay K2 and a load device 31 are connected between terminals 27 and 28. A resistor 32 is interconnected between the junction of the coil of relay K2 and resistor 26 and the junction of contacts 30 and load 31. By proper adjustment of the values of resistors 26 and 32, any chattering of contact 30 is avoided.

One phenomenon sometimes encountered with the use of the device of FIGURE 1 is that if the element is exposed to an atmosphere having a very high humidity and voltage is not applied between the helical wires or current is not supplied to the heater coil, the hygroscopic material in the pores of the alumina absorbs a considerable amount of moisture such that the electrical resistance thereof is extremely low. If, after the device has been left in this condition for some time, it is suddenly subjected to full-line voltage between the coils thereof, a very high current results. If, for example, the device in such a condition is used in a humidity-measuring device such as that shown in FIGURE 2 wherein the current is measured by means of a sensitive ammeter to determine the humidity of the atmosphere, the high current provided may damage the instrument.

FIGURE 5 illustrates a schematic electric diagram of a cricuit to protect a current measuring instrument used in conjunction with a humidity-sensing element as shown in FIGURE 1. In this arrangement, conductor 13 is connected through a resistor 33 to an electrical terminal 34. Conductor 15 is connected through a resistor 35 also through terminal 34. An ammeter 36 and a current limiting resistor 37 are serially connected between terminal 38 and coil 14. While adjusting the resistance of resistor 37 to a sufficiently high value to protect meter 36 would appear to solve the problem, since the current-carrying capacity of the core is limited, it is desirable for linearity of instrument response that the value of this resistance be kept at a minimum. This is accomplished by the addition of a relay K3, the coil of which is connected between terminal 38 and conductor 15, and for improved operation, a glow lamp 39 is interconnected betwen the coil of relay K3 and conductor 15. The normally closed contacts 40 of relay K3 are connected between coil 14 and terminal 38. In the particular embodiment shown, resistors 33 and 35 are employed to limit and distribute the current to coils 13 and 15.

Let it be assumed, for purposes of describing the operation of this apparatus, that sensing element 12 contains a large amount of water such that the electrical resistance thereof is quite low, and as a result, when voltage is first supplied between terminals 34 and 38, a high current exists in the coils and their associated conductors. At this time, however, this high current does not pass through instrument 36 because of the short circuit provided thereacross by the normally closed contacts 40. As the heat from the initial rush of current through the sensing element evaporates the water therefrom, the voltage between the coils slowly increases as the excess current decreases until it reaches a value sufficient to energize relay K3 and open contacts 40. At this time, the current in the element has decreased to a value such that it may be safely passed directly through instrument 36 without possible damage.

A glow tube 39 is provided in series with the coil of relay K3 for greater control of the time at which the coil becomes energized. As is known in the art, a glow tube provides a substantially open circuit until the voltage thereacross reaches the point to cause breakdown. Consequently, in this circuit arrangement, the voltage across the tube gradually increases until breakdown occurs, at which time, a sudden flow of current appears in the coil of relay K3 and more definitely opens contacts 40.

The humidity-sensing device and its uses hereinbefore described provides an economical and accurate means for measuring and controlling humidity in the home and for industrial use. Its inherent simplicity and ability to hold a large amount of the humidity-sensitive material gives it an exceedingly long life, and the control of the stability thereof, together with the point of operation which is adjustable by use of the heater element, provides a highly sensitive yet readily calibrated instrument suitable for laboratory as well as home or industrial use.

While my invention has been described by a particular embodiment thereof, it will be understood that many changes and modifications may be made by those skilled in the art without departing from my invention. Therefore, by the appended claims, I intend to cover all such changes and modifications.

What I claim as new and desire to secure by Letters Patent of the United States is:

1. In a humidistat, the combination of a pair of spaced electrodes, a hygroscopic material between said electrodes, means for supplying current of one magnitude to one of said electrodes to heat said material, and means controlled in response to the resistance provided between said electrodes by said material to vary the magnitude of said current in accordance with the moisture content of said material.

2. In a humidistat, the combination of a pair of spaced electrodes, hygroscopic material interposed between said electrodes and electrically bridging said electrodes, means for passing current of one magnitude through one of said electrodes to heat said hygroscopic material, switch means responsive to current between said electrodes and through said hygroscopic material, and means for modifying the magnitude of said current to vary the resistance of said hygroscopic material in response to actuation of said switch means.

3. A humidity-sensitive device comprising a pair of conductors, a hygroscopic material between said conductors, means for supplying a voltage between said conductors to cause a current to flow through said hygroscopic material, means for heating one of said conductors to heat said hygroscopic material to vary the current conducted between said conductors for a given ambient humidity, and means responsive to current between said conductors for adjusting the magnitude of said current.

References Cited in the file of this patent

UNITED STATES PATENTS

| | | |
|---|---|---|
| 1,902,427 | Sawyer | Mar. 21, 1933 |
| 2,234,858 | Brown | Mar. 11, 1941 |
| 2,358,406 | Lichtgarn | Sept. 19, 1944 |
| 2,554,440 | Coburn | May 22, 1951 |
| 2,617,972 | Nutter | Nov. 11, 1952 |
| 2,647,234 | Pear | July 28, 1953 |
| 2,717,957 | Ohlheiser | Sept. 13, 1955 |
| 2,740,032 | Bouyoucos | Mar. 27, 1956 |
| 2,806,991 | White | Sept. 17, 1957 |